US006826512B2

(12) United States Patent
Dara-Abrams et al.

(10) Patent No.: US 6,826,512 B2
(45) Date of Patent: Nov. 30, 2004

(54) USING LOCAL DEVICES AS DIAGNOSTIC TOOLS FOR CONSUMER ELECTRONIC DEVICES

(75) Inventors: Joseph Dara-Abrams, Los Altos, CA (US); Klaus Hofrichter, Santa Clara, CA (US); Ravi Gauba, Fremont, CA (US); David G. Gaxiola, San Jose, CA (US); Jun Ouyang, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/896,790

(22) Filed: Jun. 28, 2001

(65) Prior Publication Data

US 2003/0004680 A1 Jan. 2, 2003

(51) Int. Cl.[7] .................................................. G06F 11/22
(52) U.S. Cl. ........................ 702/183; 702/121; 702/123
(58) Field of Search .................................. 702/182–186, 702/58, 59, 62, 108, 117–119, 121–123, 188, FOR 105, FOR 104, FOR 135, FOR 470, FOR 134, FOR 171; 725/78, 107, 109; 340/657, 3.43, 286.61, 286.62, 292; 700/79–81, 83, 84, 86, 87, 293, 294; 324/500, 510–512, 531; 345/965, 967, 970, 769, 733; 379/102.02, 102.03, 102.05, 106.01, 106.03; 714/46, 25, 31; 348/14.04, 14.03, 180, 187, 189; 600/436; 370/352

(56) References Cited

U.S. PATENT DOCUMENTS

| | | | | |
|---|---|---|---|---|
| 5,915,026 A | * | 6/1999 | Mankovitz | .................. 713/168 |
| 5,938,757 A | * | 8/1999 | Bertsch | ........................ 712/36 |
| 6,002,868 A | * | 12/1999 | Jenkins et al. | ............... 345/769 |
| 6,005,861 A | * | 12/1999 | Humpleman | ................. 370/352 |
| 6,026,150 A | | 2/2000 | Frank et al. | ............. 379/90.01 |
| 6,065,136 A | * | 5/2000 | Kuwabara | ..................... 714/31 |
| 6,173,422 B1 | * | 1/2001 | Kimura et al. | .............. 348/180 |
| 6,175,934 B1 | * | 1/2001 | Hershey et al. | ................ 714/25 |
| 6,288,646 B1 | * | 9/2001 | Skardon | ...................... 340/627 |
| 6,288,716 B1 | * | 9/2001 | Humpleman et al. | ....... 345/733 |
| 6,363,434 B1 | * | 3/2002 | Eytchison | ................... 709/313 |
| 6,381,557 B1 | * | 4/2002 | Babula et al. | .............. 600/436 |
| 6,466,971 B1 | * | 10/2002 | Humpleman et al. | ....... 709/220 |
| 6,611,537 B1 | * | 8/2003 | Edens et al. | ................. 370/503 |
| 6,701,449 B1 | * | 3/2004 | Davis et al. | .................... 714/4 |
| 2002/0059030 A1 | * | 5/2002 | Otworth et al. | ............... 702/19 |
| 2002/0095269 A1 | * | 7/2002 | Natalini et al. | ............. 702/188 |
| 2002/0120481 A1 | * | 8/2002 | Primm et al. | ............... 709/224 |

* cited by examiner

*Primary Examiner*—Hal Wachsman
(74) *Attorney, Agent, or Firm*—Blakely, Sokoloff, Taylor & Zafman LLP (57) ABSTRACT

In one embodiment, when a problem with a consumer electronic device owned by a user is identified, a diagnostic procedure is provided to control the diagnosis of the potentially faulty consumer electronic device by a testing consumer electronic device. The testing consumer electronic device is a local device owned by the user that is operable to diagnose problems associated with the potentially faulty consumer electronic device. In one embodiment, the testing consumer electronic device and the potentially faulty consumer electronic device are part of a home network enabling their communication during the diagnosis. In another embodiment, the testing consumer electronic device and the potentially faulty consumer electronic device can communicate only during the diagnosis using a special purpose connectivity means. In yet another embodiment, the testing consumer device and the potentially faulty consumer electronic device can communicate using their user interfaces.

29 Claims, 8 Drawing Sheets

USING LOCAL DEVICES AS DIAGNOSTIC TOOLS FOR CONSUMER ELECTRONIC DEVICES

FIELD OF THE INVENTION

The present invention relates generally to maintenance of consumer electronic devices, and more specifically to using local devices as diagnostic tools for consumer electronic devices.

BACKGROUND OF THE INVENTION

The proliferation of multimedia technology has spawned a growth in the number and diversity of different consumer electronic devices commonly found in the average home. Such devices may include personal computers, workstations, digital televisions, Personal Video Recorders (PVR's), set-top boxes, digital video recorders, game devices, personal digital assistants (PDA's), printers, audio devices (e.g., jukebox AV systems, CD players and mini-disc players), and audio/video (AV) hard drives.

Although ownership of a variety of electronic devices provides a user with an enhanced living experience, the use and maintenance of all of these devices can be very complicated and can cause frustration even to a more technically astute user. This problem is partially due to the fact that each of the devices requires a different operational procedure, and, should there be problems with expected behavior, requires different procedures for diagnosing the problematic behavior and preparing the faulty device for repair. Typically, effective diagnosis of the fault requires ancillary test equipment that is unavailable to the user and complex diagnostic procedures that are beyond the understanding of the user. As a result, the faulty device needs to be physically transported to a repair facility where experienced technicians can diagnose and then repair the problem. However, because each of the devices may be provided by a different manufacturer, the process of contacting vendor service centers for help, and shipping the device back and forth for diagnosis and repair can be very tedious and expensive.

Therefore, it would be advantageous to provide a mechanism for diagnosing consumer electronic devices locally, thereby eliminating a need to find a service center associated with the faulty device and to ship the faulty device to this service center.

SUMMARY OF THE INVENTION

The present invention relates to various aspects for using local devices as diagnostic tools for consumer electronic devices.

According to one aspect of the present invention, when a problem with a consumer electronic device owned by a user is identified, a diagnostic procedure is provided to control the diagnosis of the potentially faulty consumer electronic device by a testing consumer electronic device. The testing consumer electronic device is a local device owned by the user that is capable of diagnosing problems associated with the potentially faulty consumer electronic device. In one embodiment, the testing consumer electronic device and the potentially faulty consumer electronic device are part of a home network. The home network enables communication of the testing consumer electronic device and the potentially faulty consumer electronic device during the diagnosis. In another embodiment, the testing consumer electronic device and the potentially faulty consumer electronic device are communicatively coupled to each other only during the diagnosis using a special purpose connectivity means.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Methods and apparatus for diagnosing consumer electronic devices are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
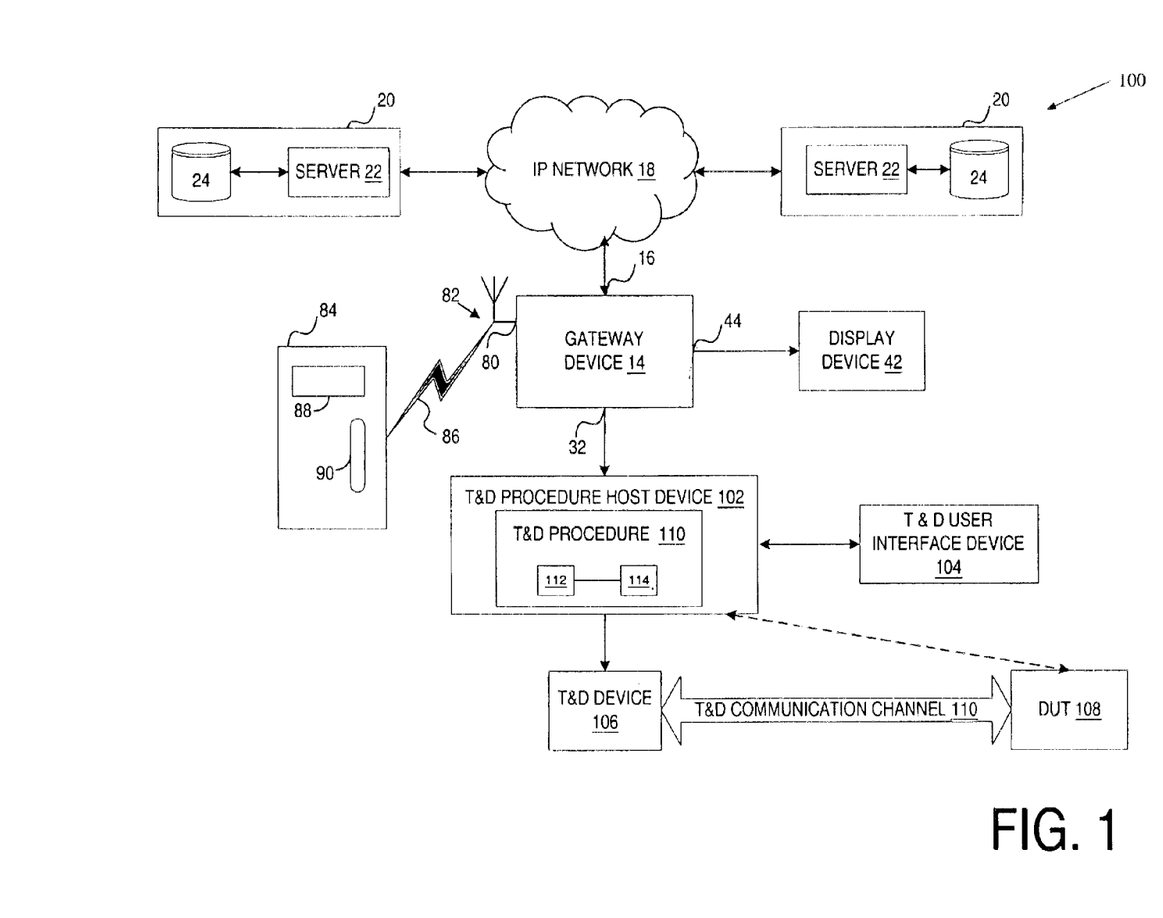
FIG. 1 is a block diagram of one embodiment of a diagnostic system.

FIG. 1 is a block diagram of one embodiment of a diagnostic system 100. System 100 includes a gateway device 14 having a port 16 communicatively coupled with an internet protocol (IP) network 18 such as the Internet thereby enabling the gateway device 14 to access a plurality of different server sites including a remote maintenance server site 20 having a computer system 22 operative to access at least one associated database 24. The database 24 stores a variety of support service applications including diagnostic procedures to diagnose problems associated with the operation of consumer electronic devices owned by the user of system 100. Upon receiving a request for a support service application, server 22 selects the requested service application from the database 24 using device identifying information (e.g., the vendor, model number and serial number of the device) included in the request.

The gateway device 14 may be any type of a device capable of accessing the server site 20 and requesting a support service application from the database 24. For example, the gateway device 14 may be a personal computer, a laptop, a personal digital assistant (PDA), a consumer electronic device, etc. The gateway device 14 includes a port 44 communicatively coupled with a display device 42. The display device 42 may be a television or any other type of display device such as a CRT or flat panel display. The gateway device 14 further includes a port 80 communicatively coupled with an electromagnetic detector 82 that is responsive to signals transmitted by a wireless remote control device 84 via a wireless link 86. In one embodiment wherein the wireless link 86 is a radio frequency (RF) link, each of the remote control device 84 and gateway device 14 includes an RF transceiver, and the detector 82 is an RF antenna. The wireless link 86 may also be an infrared (IR) link. If the system 100 does not include the display device 42, the remote control device 84 may also include a display unit 88 and a select button 90 for receiving user input.

System 100 further includes a number of consumer electronic devices owned by the user of system 100. The consumer electronic devices that are further described below in conjunction with FIG. 2 may include any combination of such devices as a personal computer (PC) system, a PDA, a game device (e.g., Sony Play Station), audio devices (e.g., a compact disk player, jukebox AV system, or mini-disc player) including speakers, a television (TV), a set top box connected to the TV, a digital video recorder (e.g., a TIVO™ system) which may use a digital cable service, a camcorder, a hard disk storage device providing additional storage of media assets including digital video content (e.g., MPEG format video content), etc.

In one embodiment, the consumer electronic devices are communicatively coupled with each other and with a port 32 of the gateway device 14 via a home network. An exemplary home network system will be described in more detail below in conjunction with FIG. 2. Alternatively, the consumer electronic devices may or may not be able to communicate with each other during their normal operation. In this embodiment, at least some of these devices are communicatively coupled with each other only for purposes of test and diagnosis as will be described in greater detail below.

In one embodiment, some or all of the consumer electronic devices are capable of performing test and diagnosis (T&D) functions for other devices owned by the user that may potentially have a fault, and the potentially faulty devices (also referred to herein as devices under test or DUTs) are designed to operate with testing devices (also referred to as T&D devices) for purposes of diagnosis. FIG. 1 illustrates a consumer electronic device 108 representing a DUT and the consumer electronic device 106 representing a T&D device capable of diagnosing the DUT 108. The T&D device 106 is communicatively coupled with the DUT 108 via a T&D communication channel 110. In one embodiment, the T&D communication channel 110 is a home network operational channel. In another embodiment, the T&D communication channel 110 is the T&D device's operational user interface channel. In yet another embodiment, the T&D communication channel 110 is a special-purpose communication channel established specifically for the diagnosis of the DUT 108. The use of various communication channels for diagnosing potentially faulty consumer electronic devices will be described in greater detail below in conjunction with FIGS. 5–7.

In one embodiment, when a problem with the operation of one or more consumer electronic devices is noticed by the user, the gateway device 14 is used by the user to report the problem. In response, the gateway device 14 facilitates the user input of information indicative of the problem (e.g., a list of symptoms associated with the problem) and communicates with the server site 20 to request a diagnostic procedure (referred to herein as a T&D procedure) appropriate for diagnosing the problem described by the user. Alternatively, the user is provided with an option to report the problem directly to a customer service representative (e.g., via email, telephone, etc.) who then initiates the transfer of an appropriate T&D procedure to the gateway device 14.

The T&D procedure transferred to the gateway device 14 is further downloaded to a T&D procedure host device 102. In one embodiment, the T&D procedure host device 102 is a component of the gateway device 14 and no additional downloading is needed. In another embodiment, the T&D procedure host device 102 is a component of the T&D device 106. In this embodiment, the gateway device 14 is communicatively coupled with the T&D device 106 (either via a network or any other connectivity means known in the art). In yet other embodiments, the T&D procedure host device 102 is either an independent device or a component of any other device owned by the user. In these embodiments, the T&D procedure host device 102 is communicatively coupled with the port 32 of the gateway device 14 and with the T&D device 106 via a home network or any other connectivity means known in the art. In any of the above embodiments, the DUT 108 may or may not be in communication with the T&D procedure host device 102.

The T&D procedure 110, residing on the T&D host device 106, controls the diagnosis of the DUT 108 by the T&D device 106. In one embodiment, the T&D procedure 110 includes a data collector 112 and a problem identifier 114. The data collector 112 is responsible for collecting data concerning the functionality of the DUT 108. The data is collected using the T&D device 106 via various communication channels between the DUT 108 and T&D device 106 as will be described in greater detail below in conjunction with FIGS. 5–7. The problem identifier 114 is responsible for utilizing the collected data to identify a problem with the DUT 108. In one embodiment, two or more consumer electronic devices potentially have a fault, and the T&D device 106 diagnoses all of the potentially faulty devices. In one embodiment, two or more T&D devices participate in the diagnosis of the potentially faulty device(s) 108.

In one embodiment, the T&D procedure host device 102 is communicatively coupled to a user interface device 104 that presents diagnostic information to the user and facilitates user input of information required by the T&D procedure. In one embodiment, the user interface device 104 is the display device 42. In other embodiments, the user interface device 104 is a component of the T&D device 106. In yet another embodiment, the user interface device 104 is an independent device or any other device owned by the user.

Figure 2:
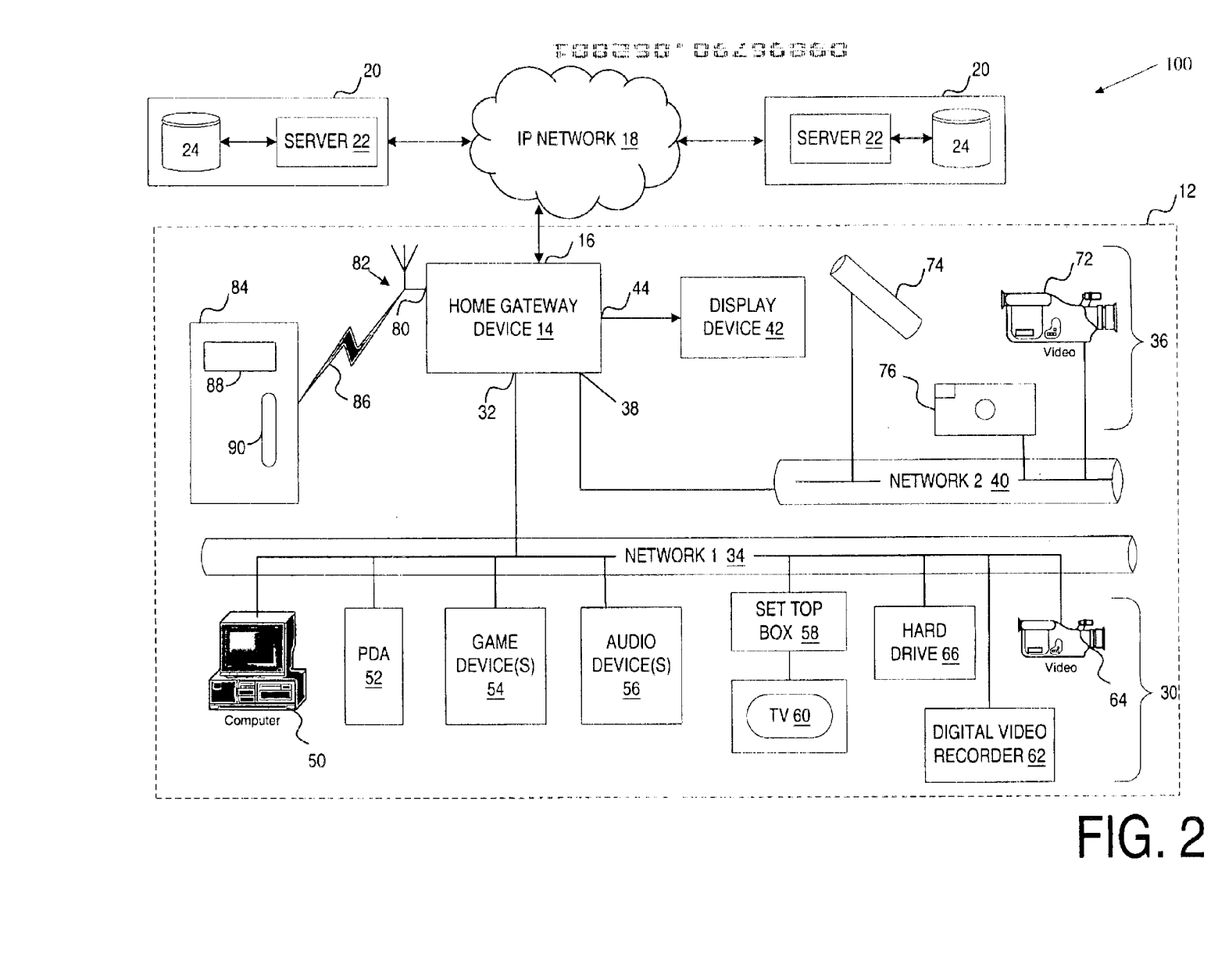
FIG. 2 is a block diagram of an exemplary home network system.

As described above, in one embodiment, the T&D device 106, the DUT 108, the T&D procedure host device 102 and the user interface device 104 are communicatively coupled to each other via a home network. FIG. 2 is a block diagram of an exemplary home network system 12.

Referring to FIG. 2, the home network system 12 includes a gateway device 14 having a port 16 communicatively coupled with an internet protocol (IP) network 18 such as the Internet. The home network system 12 also includes: a first group of electronic devices 30 communicatively coupled with a port 32 of the gateway device 14 via a first home network 34 designated NETWORK_1; a second group of electronic devices 36 communicatively coupled with a port 38 of the gateway device via a second home network 40 designated NETWORK_2; and a display device 42 communicatively coupled with port 44 of the gateway device. The first and second home networks 34 and 40 may be implemented using any technology that provides for a quality of service including reliable exchange of service application commands and timely delivery of multiple digital audio-video (AV) streams between each of the electronic devices 30 and 36 respectively, and between the gateway device 14 and the electronic devices 30 and 36 respectively. For example, NETWORK_1 may be implemented in accordance with the Home Audio Video interoperability (HAVi) standard based on the digital IEEE-1394 serial interface standard which currently allows for each of the devices 30 and the gateway device 14 to send and receive service commands and streams of digital AV content at speeds up to 400 Mbps. The HAVi standard provides a home network architecture as open, scaleable, platform independent, and language neutral. NETWORK_2 may be implemented in accordance with the universal serial bus (USB) communications standard which currently allows for each of the devices 36 and gateway device 14 to send and receive service commands and streams of digital AV content at speeds up to 12 Mbps. Alternatively, either of the networks 34 and 40 may be implemented in accordance with the Ethernet standard or any other connection providing adequate quality of service for commands and streams of digital AV content.

The first group of electronic devices 30, each of which is connected to the gateway device via NETWORK_1, include: a first personal computer (PC) system 50 having a system memory (not shown) for storing computer readable instructions, and a processor (not shown) for executing computer readable instructions; a personal digital assistant (PDA) 52; at least one game device 54 (e.g., Sony Play Station); audio devices 56 (e.g., a compact disk player, jukebox AV system, or mini-disc player) including speakers (not shown); a set top box 58 connected to a television (TV) 60 to provide the TV with satellite/cable television services; a digital video recorder 62 (e.g., a TIVO™ system) which may use a digital cable service; a camcorder 64; and a hard disk storage device 66 providing additional storage of media assets including digital video content (e.g., MPEG format video content). The second group electronic devices 36 includes a camcorder 72, a Sony Music clip 74, and a digital camera 76 each being a connected to the gateway device via NETWORK_2. In the above example, each of the devices 36 is a USB compatible device.

The home network system 12 provides interoperability of the networked electronic devices 30, 36. The networks 30 and 36 provide quality of service connection between networked devices in order to handle the exchange of both commands and multiple digital AV streams between the devices 30, 36 and the gateway device 14. The benefit of the network 12 of interoperable devices is that it enables sharing of device resources in order to accomplish sophisticated applications by providing seamless exchange of instructions and AV data between electronic devices in the home network.

In one embodiment, the network system 12 allows for configuring at least one of the devices (e.g., a personal computer system) to be a controlling device that is operative to provide for remotely controlling other electronic devices in the home network system. For example, a user may program a recording on a VCR following a menu generated by the TV on the TV screen. In accordance with the HAVi standard, there is no single controlling device. Any device in the network that has been designed to do so can control other devices.

In order for a controlling device to control a particular controlled device in a home network, the controlling device must be able to access a particular control application having executable code for controlling the particular controlled device. Some of the electronic devices in the home network may be provided with an internal ROM unit having stored thereon an associated control application for controlling the device. For these devices, the control application may be transmitted from the controlled device to the controlling device. Also, some of the electronic devices may be packaged and sold with a disk having an associated control application stored thereon. For these devices, the control application could be loaded to the controlling device from the disk. However, for other electronic devices, it may be that no compatible service application is available.

The gateway device 14 is operative to access, load, and execute a wide variety of different types of service applications providing home network services associated with each of the electronic devices 30, 36 in the home network system. Categories of home network support service applications include: remote user manual support service applications for helping users to learn how to use associated devices; remote maintenance support service applications providing for the performance of remote maintenance functions on associated devices; and diagnosis support service applications (referred to herein as T&D procedures) controlling the diagnosis of DUTs by T&D devices as will be described in more detail below.

Some of the electronic devices 30 and 36 may be provided with an internal ROM unit (or some other form of local persistent storage) having stored thereon an associated service application. For these devices, the service application may be transmitted from the device to the gateway (or a T&D procedure host device described above) for subsequent execution as further explained below. Also, some of the electronic devices may be packaged and sold with a disk (or other form of removable storage media) having an associated service application stored thereon. For these devices, the service application could be loaded to the gateway or T&D procedure host device from the disk. For electronic devices, for which no compatible service application is available on the local home network, the gateway device 14 is operative to download service applications associated with selected devices via the Internet.

In one embodiment, the gateway device 14 provides a GUI service selection menu on the display device 42 enabling a user to select a particular device and an associated service application to be executed for providing a service associated with the particular device. Also in an embodiment, the wireless remote control device 84 may be used to interact with the service selection menu by providing user input indicative of a selected one of the devices and associated services. Note that in accordance with the HAVi architecture, all of the electronic devices 30 may control functions performed by other ones of the electronic devices 30 if configured to do so. Therefore, in accordance with the present invention, any of the electronic devices 30 could be configured to provide the gateway device. Other communication capabilities of networked consumer electronic devices will described in greater detail below in conjunction with FIG. 5.

Figure 3:
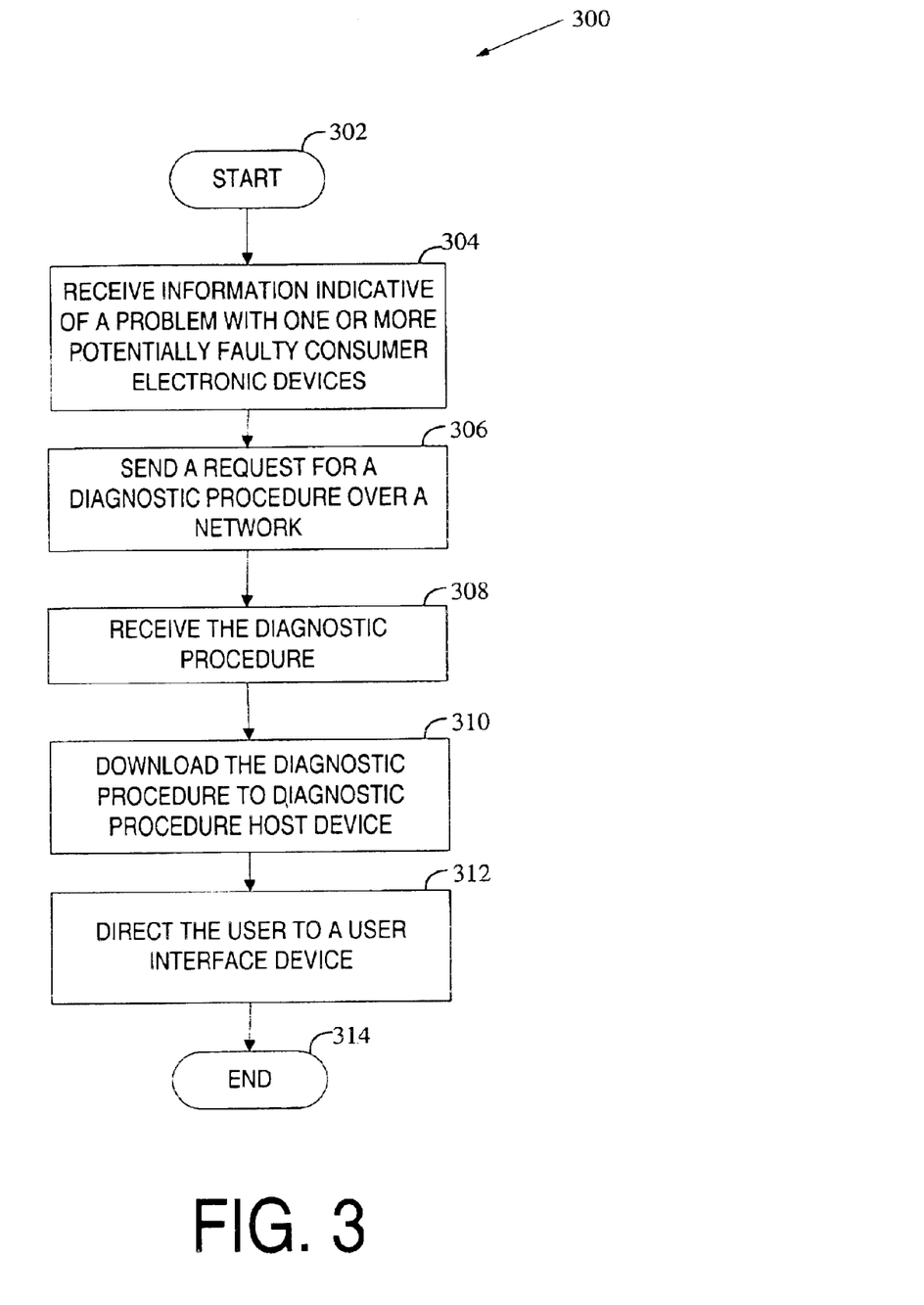
FIG. 3 is a flow diagram of a method for initiating the diagnosis of a potentially faulty consumer electronic device, according to one embodiment of the present invention.

FIG. 3 is a flow diagram of a method 300 for initiating the diagnosis of a potentially faulty consumer electronic device, according to one embodiment of the present invention. Method 300 begins with receiving information indicative of a problem with a potentially faulty consumer electronic device (processing block 304). In one embodiment, this information includes symptoms of the problem and is received when the user reports the problem via a user interface of a gateway device. Alternatively, the user reports the problem directly to a customer service representative who directs the user to the gateway device and instructs the user to perform certain manipulation with the gateway device to initiate the diagnosis of the problem. For instance, the user may be instructed to click on an icon or a link on the screen, press a key on a keyboard, press a button on a remote control, etc. In this embodiment, the information indicative of the problem includes one or more signals generated as a result of the user manipulation with the gateway device.

At processing block 306, a request for a diagnostic procedure associated with the described problem is sent to a network server that stores various diagnostic procedures. In one embodiment, the user reports the problem to a customer service representative who initiates the transfer of the request for a diagnostic procedure to the network server. In this embodiment, processing block 306 does not need to be executed.

At processing block 308, the requested diagnostic procedure is received from the network server to control the diagnosis of the potentially faulty device (a DUT) by the testing device (a T&D device). The diagnostic procedure is selected using device identifying information obtained from persistent storage local to the DUT or provided directly by the user (e.g., the device's vendor, model number, serial number, etc.) and/or symptoms of the problem. In one embodiment, more than one device may potentially have a fault. Then, the device identifying information includes parameters of each potentially faulty device, and the diagnostic procedure controls the diagnosis of all of these devices.

In one embodiment, in which a diagnostic procedure host device is different from the gateway device, the diagnostic procedure is downloaded to the diagnostic procedure host device (processing block 310). Before the download, the user may be instructed to connect the gateway device to the diagnostic procedure host device if no prior connection existed between the two devices. In one embodiment, the diagnostic procedure host device is a component of the T&D device designated to diagnose one or more DUTs.

In one embodiment, a user interface provided by the diagnostic procedure is presented on a device other than the gateway's display device. In this embodiment, the user is directed to the device which will present the user interface of the diagnostic procedure to the user during the execution of the diagnostic procedure (processing block 312). In one embodiment, the user is instructed to connect the DUT and the T&D device with a special purpose connectivity means (e.g., a special purpose cable) to perform the diagnosis.

Figure 4:
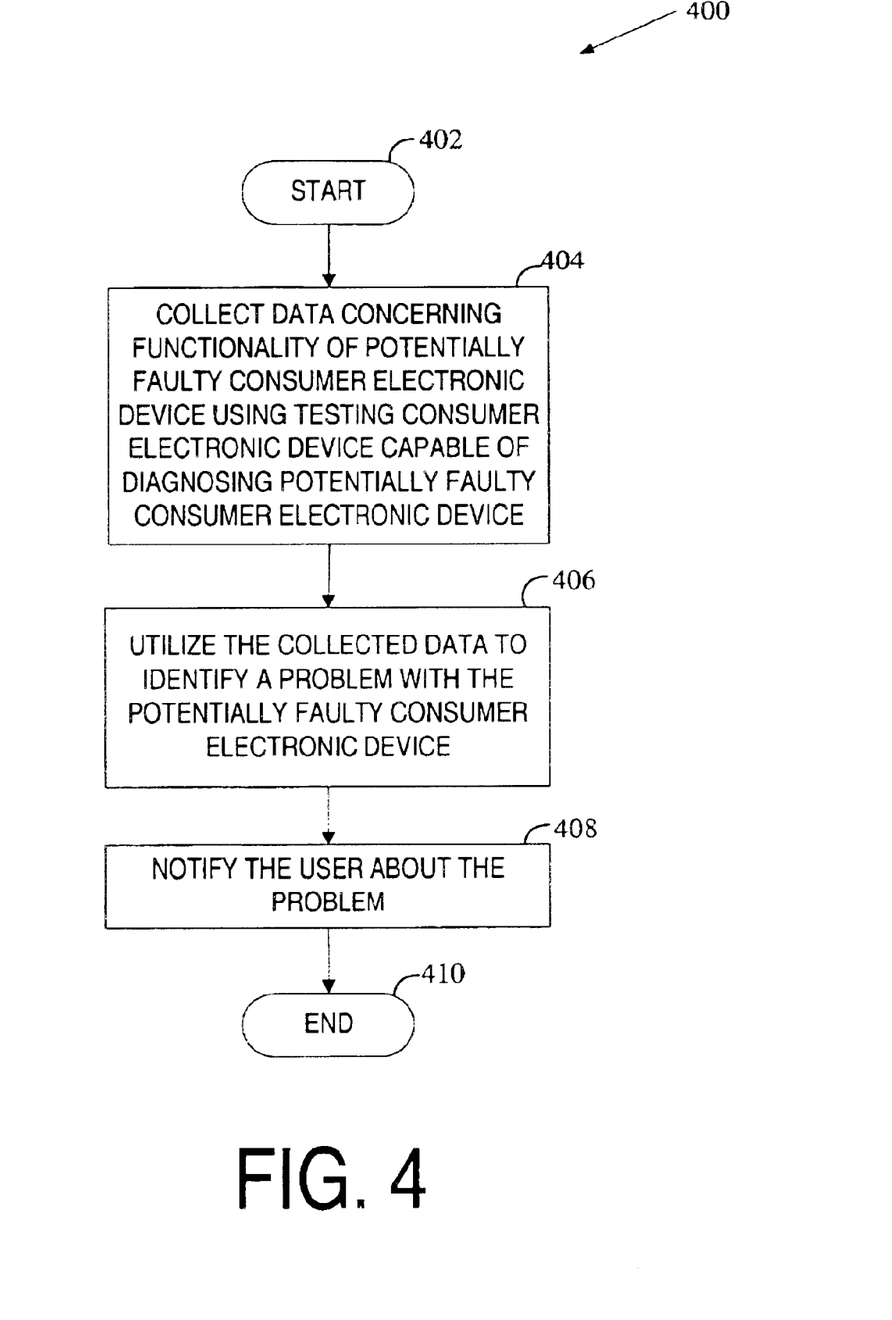
FIG. 4 is a flow diagram of a method for performing a diagnostic procedure associated with a potentially faulty consumer electronic device, according to one embodiment of the present invention.

FIG. 4 is a flow diagram of a method 400 for performing a diagnostic procedure associated with a potentially faulty consumer electronic devices, according to one embodiment of the present invention. As described above, a diagnostic procedure (a T&D procedure) is executed to control the diagnosis of a potentially faulty consumer electronic device (a DUT) by a testing consumer electronic device (a T&D device).

Method 400 begins with collecting data concerning the functionality of a DUT at processing block 404. The data is collected using a T&D device that is capable of diagnosing the DUT. In one embodiment, in which the T&D device and the DUT can communicate to each other via a home network, the data is collected using the regular home network communication capability of the T&D device and DUT, as will be described in greater detail below in conjunction with FIG. 5. In another embodiment, this data is collected using an operational user interface channel, as will be described in more detail below in conjunction with FIG. 6. In yet another embodiment, the data is collected using a special purpose T&D connectivity means, as will be described in greater detail below in conjunction with FIG. 7.

In one embodiment, the home network contains a consumer electronic device that is known to operate properly and is similar to the DUT. In this embodiment, the T&D device is instructed to monitor the operation of the DUT and the similar device and to provide the resulting data to the T&D procedure for comparison.

In one embodiment, the user may not be able to determine which consumer electronic device has a fault. Then, before collecting the above data, the problem is isolated to a device that actually has a fault by using a T&D procedure which invokes a sequence of T&D sub-procedures designed to test the operation of those present devices that could be responsible for the faulty behavior.

At processing block 406, the data collected as described above is utilized to identify a problem with the DUT. When the problem is identified, the user is notified about the problem. In one embodiment, a determination is made on how to remedy the situation. If possible, this remedy is performed using the T&D device or the user involvement (when simple user interaction can remedy the problem). Then, a test is conducted to verify that the problem has been corrected, and the user is presented with a report on how the problem was fixed. Alternatively, when the problem cannot be solved by the diagnostic system, the user is provided with a complete description of actions that the user needs to perform to have the faulty device repaired (e.g., the user will be instructed on how to ship the faulty device to a service center, the address and hours of operation of the service center, etc.).

In one embodiment, the T&D procedure provides direct communication between the user and a test technician over the Internet using one of the home-networked consumer electronic devices to provide the voice and/or image of the test technician to the user. In one embodiment, images of the home network situation are provided to the test technician, together with the voice of the user.

In one embodiment, the T&D capability of the consumer electronic devices are used to monitor and maintain a record of the activity of other devices within the home network during normal operation of these devices. The record may be either kept locally on the home network or remotely at the manufacturer web site. In one embodiment, the record of the device activity is used for preventative maintenance purposes. Alternatively, the record is used to compare the behavior of the potentially faulty device with previous proper behavior of this device. Correlating this internal device information with a contemporaneously recorded log of home network and device configuration changes, together with the record of the regular device use, makes T&D procedures more accurate and effective.

In one embodiment, the T&D capability of the consumer electronic device is used to generate device specific test media locally, thereby reducing the expense of providing test media with the device as originally purchased. The device-specific test media is generated when the device is known to operate properly (e.g., when the device is new) and may subsequently be used in that device or a different device if a problem arises.

Figure 5:
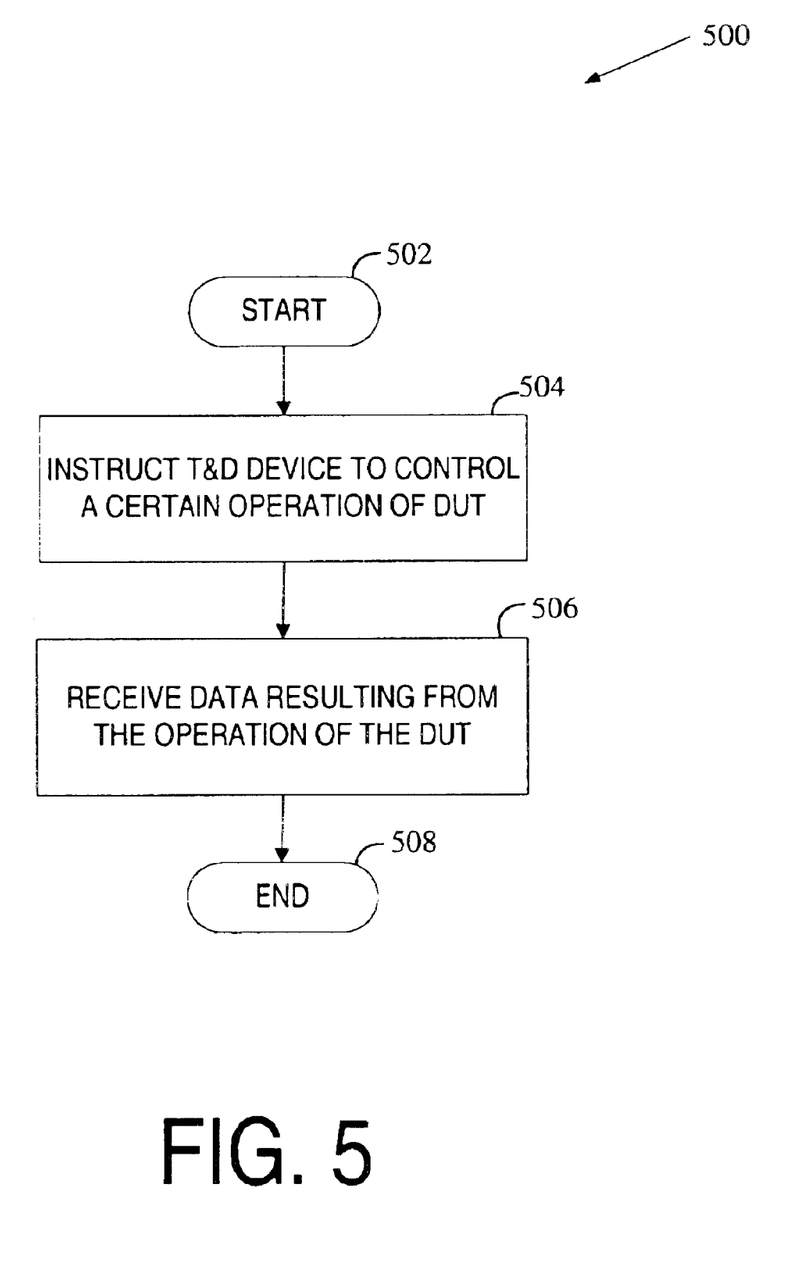
FIGS. 5–7 are flow diagrams of various embodiments of methods for using various communication channels to diagnose potentially faulty consumer electronic devices.
Figure 6:
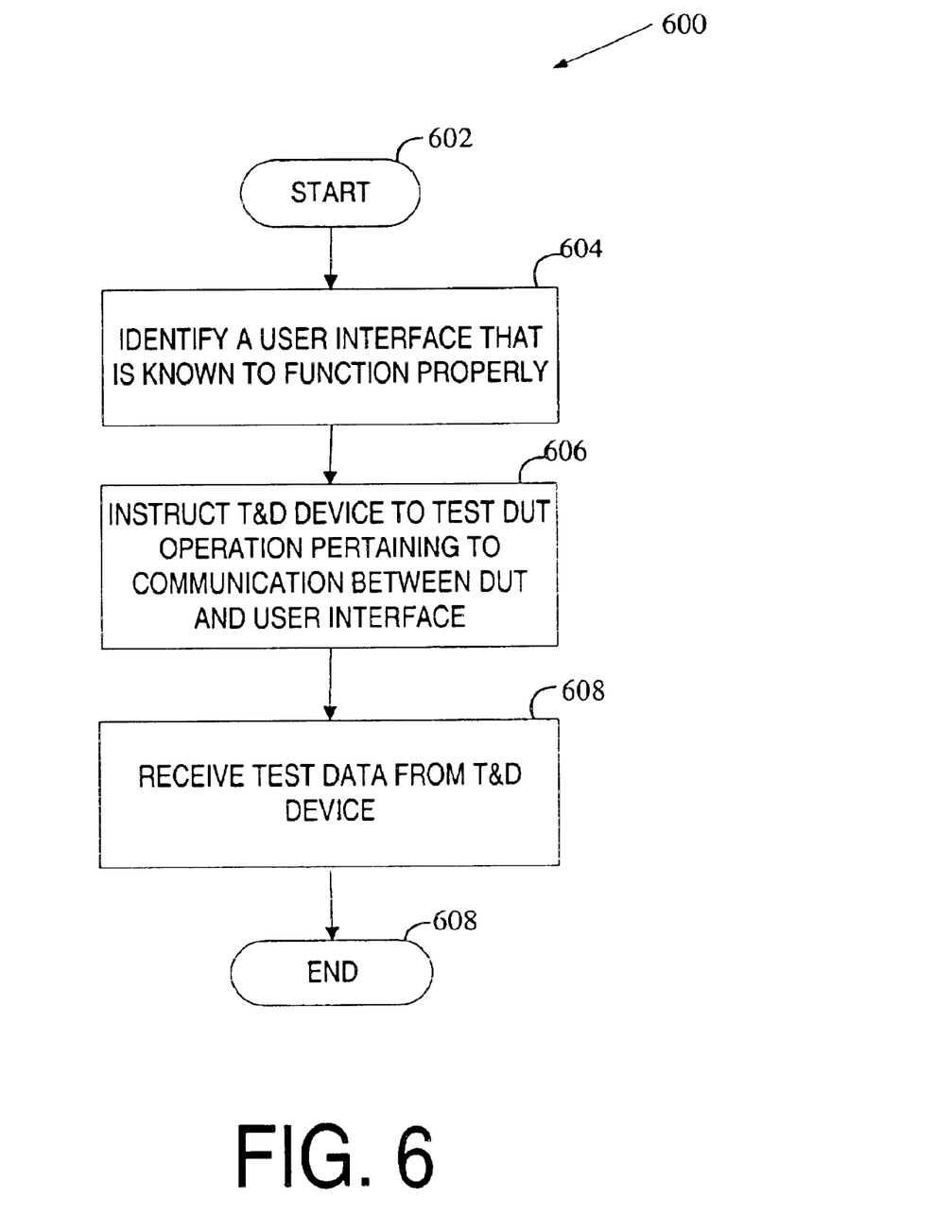
Figure 7:
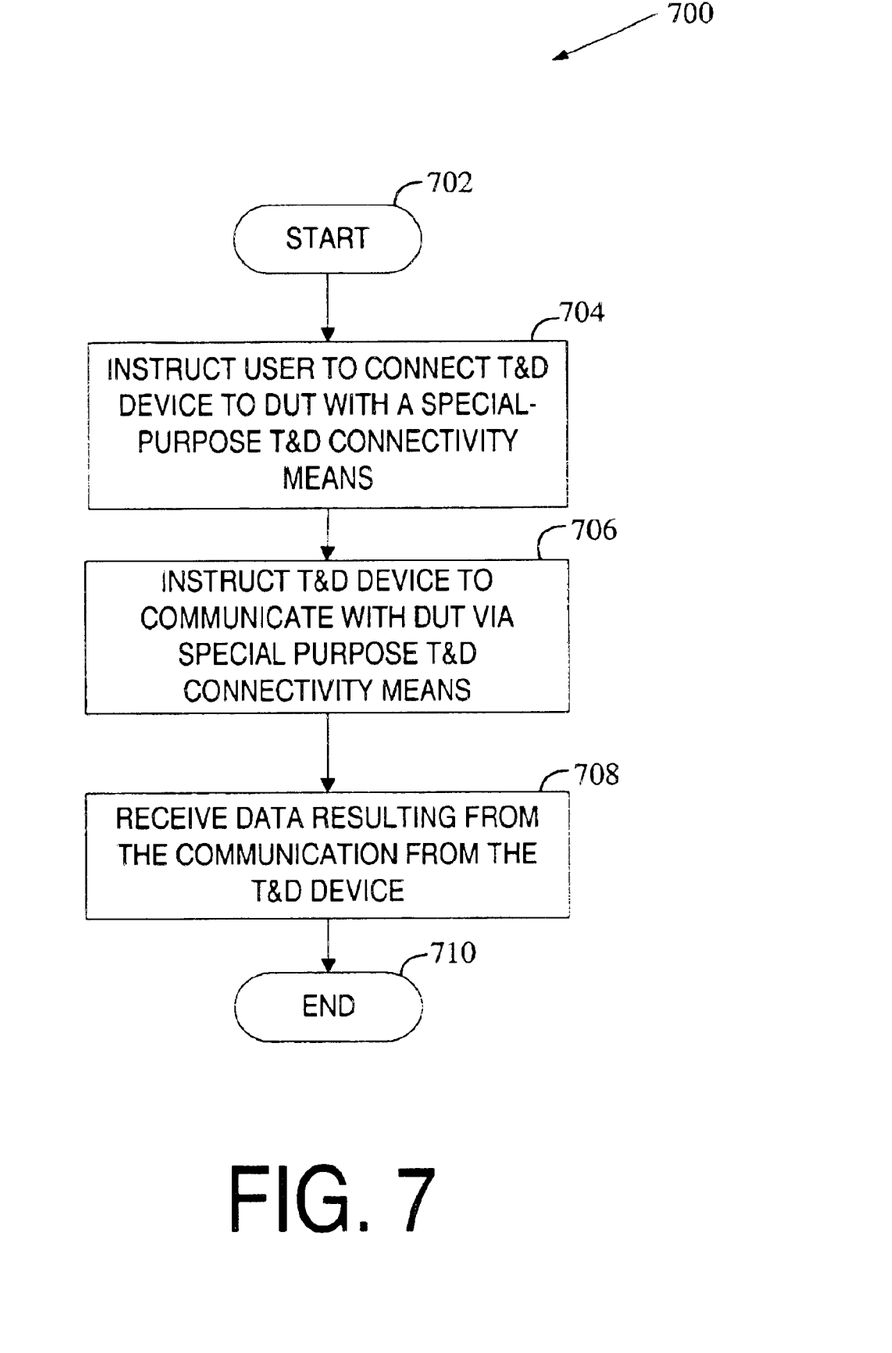

FIGS. 5–7 are flow diagrams of various embodiments of methods for using various T&D communication channels to diagnose potentially faulty consumer electronic devices.

In one embodiment, a home network operational channel is used to diagnose a DUT by a T&D device. As described above, during the regular (non-diagnostic) operation of the networked consumer electronic devices, the home network system (e.g., network system 12 of FIG. 2) allows for configuring one of the devices to be a controlling device to remotely control other electronic devices in the home network system. The home network also enables other operations of the networked devices, such as: discovery and determination of capabilities of other electronic devices in the home network; dynamic identification, download from external sources (e.g., the device manufacturer's Internet web site) and installation of software device drivers and applications; execution of resident or downloaded applications (e.g., custom AV content management and presentation software); streaming of digital data from a source device (e.g., a digital TV tuner) to a sink device (e.g., an AV hard disk and an AV display), etc. As further described below, these home network operational capabilities of the consumer electronic devices can be used to support networked consumer electronic devices when they perform their diagnostic tasks.

FIG. 5 illustrates a method 500 of diagnosing a DUT using a remote control communication capability of a T&D device, according to one embodiment of the present invention. Method 500 begins with instructing the T&D device to control a certain operation of the DUT via a home network operational channel (processing block 504). In one embodiment, the DUT will execute this operation by means of a specific T&D internal mechanism which has low-level access to and control of the DUT.

In one example, the T&D procedure may instruct the T&D device to communicate to the DUT a command to make a voltage measurement at a particular internal DUT location, to convert the measurement from analog to digital form, and to return the converted measurement to the T&D device. The measurement may be of a single scalar voltage value or of a complete voltage waveform. In addition, the T&D procedure may instruct the T&D device to specify that the time for taking the measurement should be in correlation with a clock known to both the T&D device and DUT or with an internal or external DUT event. In another example, the T&D device may be instructed to provide the DUT with a digitally represented new setting for an internal analog voltage value or a digitally represented test waveform. The T&D device will then communicate a command to the DUT to convert any of the above digital representations to an analog representation and to provide as a test stimulus to internal circuitry of the DUT device. Similarly to the prior example, the time for delivering the test stimulus to the internal circuitry may be based on a common clock or a DUT event. In yet another example, the test stimulus and a set of commands described in the prior examples may be compiled into a program when the DUT is manufactured and may be stored with the DUT. Subsequently, upon receiving a direction from the T&D procedure, the T&D device will instruct the DUT to atomically execute this program, possibly making internal measurements of a time-critical nature, and report the results to the T&D device.

Further, at processing block 506, the T&D device captures data resulting from the operation of the DUT and transfers this data to the T&D procedure for analysis of the problem associated with the DUT.

Other home network operational capabilities of the networked consumer electronic devices may be used during the diagnosis of the DUT. For instance, a T&D procedure may be downloaded to the home network and executed on a capable local host computer without any user interaction, similarly to downloading and execution of operational applications. Further, the T&D device may download a sequence of stimulus and measurement instructions to the DUT to be executed in a time-critical manner and may instruct the DUT to report the results to the T&D. In addition to the sequential execution, the DUT may support conditional and iterative execution driven by a clock external to the DUT, an external or internal DUT event, or a combination of the external clock and DUT event.

In another example, the T&D procedure may use home network streaming capability of the T&D device and the DUT to command the T&D device to generate test data on one of its streaming outputs, to direct this test data to a streaming input of the DUT and then have the DUT communicate resulting test data to the T&D device. Similarly, the T&D device may instruct the DUT to generate test data on one of its streaming outputs and to direct this data to a streaming input of the T&D device. This data is then captured by the T&D device for later analysis by the T&D procedure.

In another embodiment, a regular user interface channel is used for diagnosing a DUT. That is, a user interface of a consumer electronic device owned by the user that is known to operate properly is used to test the functionality of a DUT. Such user interface may be, for example, a properly operating TV display or microphone. FIG. 6 illustrates a method 600 for diagnosing a DUT using an operational user interface of a consumer electronic device, according to one embodiment of the present invention.

Method 600 begins with identifying an operational user interface that is known to function properly (processing block 604). For instance, the T&D procedure may use operational home network capabilities to locate a microphone or TV display that is known to function properly. In one embodiment, the T&D procedure may then instruct the user to potentiate the communication between the DUT and the user interface. For instance, the T&D procedure may instruct the user to place a DUT video camera in a position to view the TV display and turn the DUT video camera on. Alternatively, the T&D procedure may use home network operational capability of the T&D device to instruct the DUT to communicate with the user interface. For instance, the T&D procedure may instruct the T&D device to supply a DUT amplifier/speaker system with a particular test waveform and to direct the DUT amplifier speaker system to produce acoustic sounds which will be recorded by a microphone of known proper function that was located within the home network.

At processing block 606, the T&D device tests the DUT's operation that pertains to the communication between the DUT and the user interface. In the above examples, the T&D device may make measurements of internal circuitry of the DUT video camera during the DUT's operational communication with the TV display (of known proper function) while the display presents a diagnostic pattern provided by the T&D procedure. In addition, the T&D device may test the quality of the microphone's record of acoustic results of the DUT amplifier/speaker system.

Afterwards, at processing block 608, the T&D device provides test data to the T&D procedure for subsequent analysis of the problem.

In yet another embodiment, a DUT is diagnosed using a special purpose T&D interface. In particular, T&D devices and potential DUTs are designed to support a separate physical interface for T&D purposes. Such interfaces are connected only during the execution of the T&D procedure. A connectivity means used to enable communication between the T&D device and the DUT may be a special purpose electrical cable, a special purpose fiber optic cable, etc. In one embodiment, in which the T&D device and the DUT are controlled by the T&D procedure using the home network operational channel and the T&D device and the DUT have local signal conversion capabilities, the T&D interface and its associated cable are simple and inexpensive. For example, the T&D interface may be comprised of an inexpensive analog-to-digital/digital-to-analog converter and simple switching circuitry to access internal analog test points, and the cable may be a standard, inexpensive, wide-band, single-channel, shielded cable. In one embodiment, the special purpose T&D communication channel is also used to diagnose problems with home network operational communication channels (e.g., an IEEE-1394 high-speed digital network).

In an alternative embodiment, in which a home network is not used to provide communication between the T&D device and the DUT, the T&D interface and its associated cable may also carry control commands from the T&D device to the DUT and responses back from the DUT to the T&D device. FIG. 7 illustrates a method 700 of diagnosing a DUT using a special-purpose T&D communication channel, according to one embodiment of the present invention.

Method 700 begins with instructing the user to connect a T&D device with a DUT via a special purpose connectivity means such as a special purpose cable (processing block 704). At processing block 706, the T&D device is instructed to communicate with the DUT via the special purpose connectivity means. Afterwards, at processing block 708, data captured by the T&D device during this communication is received by the T&D procedure for subsequent analysis.

Figure 8:
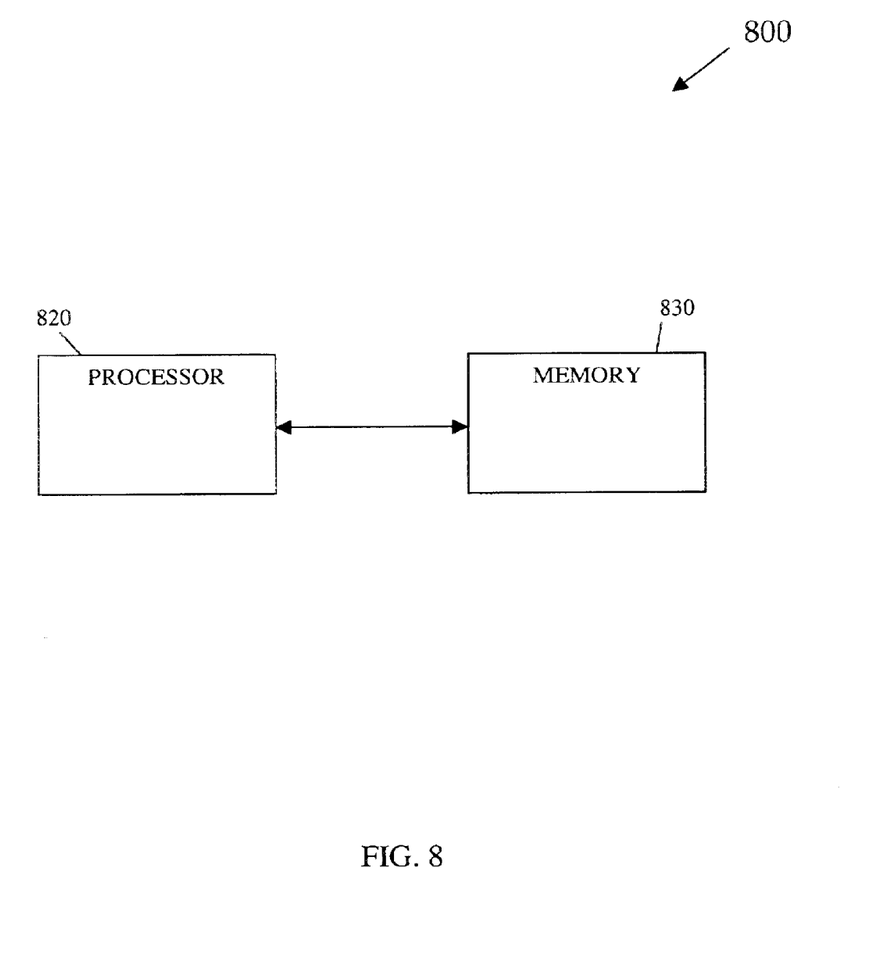
FIG. 8 is a block diagram of one embodiment of a computer system.

FIG. 8 is a block diagram of one embodiment of a processing system (e.g., a processing system of a gateway device or a T&D procedure host device). Processing system 800 includes processor 820 and memory 830. Processor 820 can be any type of processor capable of executing software, such as a microprocessor, digital signal processor, microcontroller, or the like. Processing system 800 can be a personal computer (PC), mainframe, handheld device, portable computer, set-top box, or any other system that includes software.

Memory 830 can be a hard disk, a floppy disk, random access memory (RAM), read only memory (ROM), flash memory, or any other type of machine medium readable by processor 820. Memory 830 can store instructions for performing the execution of the various method embodiments of the present invention such as methods 300–700 (FIGS. 3–7).

Thus, methods and apparatus for diagnosing consumer electronic devices have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for diagnosing consumer electronic devices, the method comprising:

receiving information indicative of a problem with one or more potentially faulty consumer electronic devices; and providing a diagnostic procedure to control diagnosis of the one or more potentially faulty consumer electronic devices by at least one testing consumer electronic device within a plurality of consumer electronic devices that comprises the one or more potentially faulty consumer electronic devices in addition to the at least one testing consumer electronic device, each consumer electronic device of the plurality of consumer electronic devices having, in addition to conventional consumer electronic device functionality, extra functionality to diagnose locally at least one other consumer electronic device within the plurality of consumer electronic devices.

2. The method of claim 1 wherein the at least one testing consumer electronic device is coupled to the one or more potentially faulty consumer electronic devices via a home network.

3. The method of claim 2 further comprising:

providing direct communication between a user and a human test technician using connection of the home network to a public network.

4. The method of claim 1 wherein the diagnostic procedure instructs a user to connect the at least one testing consumer electronic device to the one or more potentially faulty consumer electronic devices specifically for the diagnosis.

5. The method of claim 1 further comprising:

providing a user interface for performing the diagnostic procedure.

6. The method of claim 1 further comprising:

directing a user to a consumer electronic device that is designated to provide a user interface for performing the diagnostic procedure.

7. The method of claim 1 further comprising:

receiving the diagnostic procedure over a public network.

8. The method of claim 7 further comprising:

downloading the diagnostic procedure to a diagnostic procedure host device.

9. The method of claim 8 wherein the diagnostic procedure host device is a component of the at least one testing consumer electronic device.

10. The method of claim 1 further comprising:

receiving the diagnostic procedure from a home network device.

11. A method for diagnosing consumer electronic devices, the method comprising:

collecting data concerning functionality of a potentially faulty consumer electronic device using a testing consumer electronic device within a plurality of consumer electronic devices that comprises the potentially faulty consumer electronic device in addition to the testing consumer electronic device, each consumer electronic device of the plurality of consumer electronic devices having, in addition to conventional consumer electronic device functionality, extra functionality to diagnose locally at least one other consumer electronic device within the plurality of consumer electronic devices;

utilizing the collected data to identify a problem with the potentially faulty consumer electronic device; and if the problem is identified, notifying a user about the problem.

12. The method of claim 11 wherein the testing consumer electronic device communicates with the potentially faulty consumer electronic device using a home network.

13. The method of claim 12 wherein collecting data further comprises:

instructing the testing consumer electronic device to remotely control a certain operation of the potentially faulty consumer electronic device and to capture data resulting from the certain operation; and receiving the resulting data from the testing consumer electronic device.

14. The method of claim 12 wherein collecting data further comprises:

instructing the testing consumer electronic device to download a sequence of stimulus and measurement instructions to the potentially faulty consumer electronic device for execution and to capture data resulting from the execution; and receiving the resulting data from the testing consumer electronic device.

15. The method of claim 12 wherein collecting data further comprises:

instructing the testing consumer electronic device to generate test data on one of a plurality of streaming outputs, to direct the test data to a streaming input of the potentially faulty consumer electronic device, and to capture output data of the potentially faulty consumer electronic device; and receiving the output data of the potentially faulty consumer electronic device from the testing consumer electronic device.

16. The method of claim 12 wherein collecting data further comprises:

providing direct communication between a user and a test technician via an operational interface of a consumer electronic device using connection of the home network to a public network, the consumer electronic device being any one of the testing consumer electronic device and the potentially faulty consumer electronic device.

17. The method of claim 12 wherein collecting data further comprises:

comparing a current operation of the potentially faulty consumer electronic device with a prior operation of the potentially faulty consumer electronic device that was recorded before the problem arose.

18. The method of claim 12 wherein collecting data further comprises:

comparing a current operation of the potentially faulty consumer electronic device with an operation of a similar consumer electronic device that is known to operate properly.

19. The method of claim 11 wherein collecting data further comprises:

instructing the testing consumer electronic device to test an operation of the potentially faulty consumer electronic device pertaining to communication between the potentially faulty consumer electronic device and an operational user interface, the operational user interface being known to function properly; and receiving test data from the testing consumer electronic device.

20. The method of claim 11 wherein the testing consumer electronic device communicates with the potentially faulty consumer electronic device using a connectivity means that is established specifically for the diagnosis.

21. The method of claim 11 further comprising: determining which one of a plurality of potentially faulty consumer electronic devices has a fault.

22. The method of claim 11 wherein the potentially faulty consumer electronic device is diagnosed using test media generated for the potentially faulty consumer electronic device before the problem arose.

23. An apparatus for diagnosing consumer electronic devices, the apparatus comprising:

means for receiving information indicative of a problem with one or more potentially faulty consumer electronic devices; and means for providing a diagnostic procedure to control diagnosis of the one or more potentially faulty consumer electronic devices by at least one testing consumer electronic device within a plurality of consumer electronic devices that comprises the one or more potentially faulty consumer electronic devices in addition to the at least one testing consumer electronic device, each consumer electronic device of the plurality of consumer electronic devices having, in addition to conventional consumer electronic device functionality, extra functionality to diagnose locally at least one other consumer electronic device within the plurality of consumer electronic devices.

24. An apparatus for diagnosing consumer electronic devices, the apparatus comprising:

a user interface to facilitate user input of information indicative of a problem with one or more potentially faulty consumer electronic devices; and a gateway device to provide a diagnostic procedure to control diagnosis of the one or more potentially faulty consumer electronic devices by at least one testing consumer electronic device within a plurality of consumer electronic devices that comprises the one or more potentially faulty consumer electronic devices in addition to the at least one testing consumer electronic device, each consumer electronic device of the plurality of consumer electronic devices having, in addition to conventional consumer electronic device functionality, extra functionality to diagnose locally at least one other consumer electronic device within the plurality of consumer electronic devices.

25. An apparatus for diagnosing consumer electronic devices, the apparatus comprising:

means for collecting data concerning functionality of a potentially faulty consumer electronic device using a testing consumer electronic device within a plurality of consumer electronic devices that comprises the potentially faulty consumer electronic device in addition to the testing consumer electronic device, each consumer electronic device of the plurality of consumer electronic devices having, in addition to conventional consumer electronic device functionality, extra functionality to diagnose locally at least one other consumer electronic device within the plurality of consumer electronic devices;

means for utilizing the collected data to identify a problem with the potentially faulty consumer electronic device; and means for notifying a user about the problem if the problem is identified.

26. An apparatus for diagnosing consumer electronic devices, the apparatus comprising:

a data collector to collect data concerning functionality of a potentially faulty consumer electronic device using a testing consumer electronic device within a plurality of consumer electronic devices that comprises the potentially faulty consumer electronic device in addition to the testing consumer electronic device, each consumer electronic device of the plurality of consumer electronic devices having, in addition to conventional consumer electronic device functionality, extra functionality to diagnose locally at least one other consumer electronic device within the plurality of consumer electronic devices;

a problem identifier to utilize the collected data to identify a problem with the potentially faulty consumer electronic device; and a user interface to notify a user about the problem if the problem is identified.

27. A system for diagnosing consumer electronic devices comprising:

a plurality of consumer electronic devices operable to diagnose functionality of one another, the plurality of consumer electronic devices comprising one or more potentially faulty consumer electronic devices in addition to at least one testing consumer electronic device, coupled to the one or more potentially faulty consumer electronic devices, the at least one testing consumer electronic device having, in addition to conventional consumer electronic device functionality, extra functionality to diagnose the one or more potentially faulty consumer electronic devices; and a diagnostic procedure host device, coupled to the at least one testing consumer electronic device, to control diagnosis of the one or more potentially faulty consumer electronic devices, the diagnosis being performed locally by the at least one testing consumer electronic device.

28. The system of claim 27 further comprising:

a gateway device, coupled to the diagnostic procedure host device, to request a diagnostic procedure associated with the one or more potentially faulty consumer electronic devices over a network and to download the diagnostic procedure to the diagnostic procedure host device.

29. The system of claim 27 wherein the diagnostic procedure host device is a component of the at least one testing consumer electronic device.

* * * * *